US012187363B2

(12) United States Patent
Cottingham et al.

(10) Patent No.: US 12,187,363 B2
(45) Date of Patent: Jan. 7, 2025

(54) WORKING MACHINE

(71) Applicant: J. C. Bamford Excavators Limited, Uttoxeter (GB)

(72) Inventors: Darryl Cottingham, Uttoxeter (GB); Natasha Kate Rigby, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 672 days.

(21) Appl. No.: 17/249,471

(22) Filed: Mar. 2, 2021

(65) Prior Publication Data

US 2022/0281538 A1   Sep. 8, 2022

(30) Foreign Application Priority Data

Mar. 20, 2020  (GB) .................................. 2002998.9

(51) Int. Cl.
*B62D 51/00* (2006.01)
*B60K 7/00* (2006.01)
(Continued)

(52) U.S. Cl.
CPC .............. *B62D 51/002* (2013.01); *B60K 7/00* (2013.01); *B60P 1/04* (2013.01); *B60R 25/04* (2013.01);
(Continued)

(58) Field of Classification Search
CPC ... B60K 7/00; B60P 1/04; B60R 25/04; B60R 25/08; B62B 3/08; B62B 5/0026;
(Continued)

(56) References Cited

U.S. PATENT DOCUMENTS 3,566,985 A  *  3/1971  Triplett ................. B62D 61/08
                                                180/253
4,645,264 A  *  2/1987  Morrison ............ B62D 51/005
                                                165/41
(Continued)

FOREIGN PATENT DOCUMENTS

DE  10 2007 017 052 A1   10/2008
EP     1 357 232 A2      10/2003
(Continued)

OTHER PUBLICATIONS

Search Report for GB 2002998.9, dated Jun. 3, 2020.
(Continued)

*Primary Examiner* — Saul Rodriguez
*Assistant Examiner* — Brendan P Tighe
(74) *Attorney, Agent, or Firm* — MARSHALL, GERSTEIN & BORUN LLP

(57) ABSTRACT

A working machine has a frame, a ground engaging propulsion system, a drive arrangement for providing motive power to the ground engaging propulsion system, an operator platform pivotally connected to the frame and moveable between a deployed position for supporting an operator thereon and a stowed position; and a sensor arrangement configured to sense when an external force is applied to the operator platform when said operator platform is in the deployed position. The machine prevents movement of the ground engaging propulsion system when the sensor arrangement does not sense an external force applied to the operator platform when said operator platform is in the deployed position.

19 Claims, 9 Drawing Sheets

(51) Int. Cl.

| | |
|---|---|
| *B60P 1/04* | (2006.01) |
| *B60R 25/04* | (2013.01) |
| *B60R 25/08* | (2006.01) |
| *B62B 3/08* | (2006.01) |
| *B62B 5/00* | (2006.01) |
| *B62B 5/04* | (2006.01) |
| *B62D 51/02* | (2006.01) |
| *B62D 51/04* | (2006.01) |
| *E02F 3/28* | (2006.01) |
| *E02F 9/16* | (2006.01) |
| *E02F 9/24* | (2006.01) |
| *G01D 5/14* | (2006.01) |
| *G01L 5/00* | (2006.01) |

(52) U.S. Cl.
CPC ............... *B60R 25/08* (2013.01); *B62B 3/08* (2013.01); *B62B 5/0026* (2013.01); *B62B 5/0414* (2013.01); *B62D 51/007* (2013.01); *B62D 51/02* (2013.01); *B62D 51/04* (2013.01); *E02F 3/28* (2013.01); *E02F 9/166* (2013.01); *E02F 9/24* (2013.01); *G01D 5/14* (2013.01); *G01L 5/00* (2013.01); *B62B 2301/256* (2013.01)

(58) Field of Classification Search
CPC ............ B62B 5/0414; B62B 2301/256; B62D 51/007; B62D 51/02; B62D 51/04; E02F 3/28; E02F 9/166; E02F 9/24; G01D 5/14; G01L 5/00
See application file for complete search history.

(56) References Cited

U.S. PATENT DOCUMENTS

| | | | |
|---|---|---|---|
| 5,117,944 A | 6/1992 | Hurtevent | |
| 8,141,886 B1 | 3/2012 | Sugden et al. | |
| 2002/0092694 A1* | 7/2002 | McIlwraith | B62D 51/02 180/315 |
| 2004/0145134 A1* | 7/2004 | Bares | E02F 9/166 280/32.7 |
| 2004/0146389 A1* | 7/2004 | Bares | E02F 7/06 414/722 |
| 2004/0256166 A1* | 12/2004 | Holtan | B60B 33/0007 180/65.51 |
| 2005/0102866 A1* | 5/2005 | Sewell | E02F 9/166 37/411 |
| 2005/0168004 A1* | 8/2005 | Vandewinckel | B62D 51/04 296/26.12 |
| 2006/0103093 A1* | 5/2006 | Kallevig | B62D 51/04 280/79.11 |
| 2007/0132204 A1* | 6/2007 | Sewell | A01B 51/026 280/418 |
| 2016/0262305 A1 | 9/2016 | Pflanzer et al. | |
| 2021/0186782 A1* | 6/2021 | Saucier | F16H 21/16 |

FOREIGN PATENT DOCUMENTS

| | | |
|---|---|---|
| EP | 2058171 A2 | 5/2009 |
| EP | 2 239 187 A1 | 10/2010 |
| EP | 2360083 A1 | 8/2011 |
| WO | WO-2021/021943 A1 | 2/2021 |

OTHER PUBLICATIONS

Communication Pursuant to Article 94(3), issued in EP 21159703.4, dated Jun. 1, 2023.

Extended European Search Report for EP 21159703.4, dated Aug. 10, 2021.

\* cited by examiner

WORKING MACHINE

FIELD

The present teachings relate to a working machine.

BACKGROUND

Various types of working machines are known. Such machines are used typically for soil-shifting operations (e.g. trenching, grading, and loading) and materials handling (e.g. depositing aggregate in trenches, lifting materials and placing them on an elevated platform).

One such working machine are dumper vehicles. Dumper vehicles are manufactured in various different sizes to suit the needs of the application, ranging from those required for small building sites to those required for large scale construction projects.

One type of dumper vehicle is a walk-behind dumper, which enables an operator to either walk-behind the dumper vehicle to operate it, or to ride-on a platform on the vehicle to support said operator. The ride-on platform is typically provided at the rear of the vehicle behind the operator controls. In some walk-behind dumper vehicles, it is possible for the platform to be deployed whilst an operator to operate the dumper vehicle as a walk-behind dumper vehicle, even when the ride-on platform is present and deployed.

The present teachings seek to overcome or at least mitigate one or more problems associated with the prior art.

SUMMARY

A first aspect of the teachings provides a working machine comprising: a frame; a ground engaging propulsion system connected to the frame for propelling the working machine; and a drive arrangement for providing motive power to the ground engaging propulsion system; an operator platform pivotally connected to the frame and moveable between a deployed position for supporting an operator thereon and a stowed position; and a sensor arrangement configured to sense when an external force is applied to the operator platform when said operator platform is in the deployed position, wherein the working machine is configured to prevent movement of the ground engaging propulsion system when the sensor arrangement does not sense an external force applied to the operator platform when said operator platform is in the deployed positon.

The working machine has two modes of operator: a walk behind mode in which the operator platform is in the stowed position and the operator walks behind the vehicle; and a ride-on monde in which the operator is stood on the operator platform.

The sensor arrangement is able to determine whether or not an operator is standing on the platform (by determination of whether a force is applied to the platform, e.g. an upper surface of said platform). Thus, the working machine provides an arrangement where said vehicle cannot be driven with the operator platform in the deployed position unless an operator is standing on the platform.

The working machine may be configured to prevent movement of the ground engaging propulsion system when the sensor arrangement does not sense an external force above a pre-determined value applied to the operator platform when said operator platform is in the deployed positon.

This helps to improve the accuracy of the determination of whether an operator is on the platform and prevents operation of the machine occurring when small items or debris fall on the operator platform.

The working machine may be configured to prevent movement of the ground engaging propulsion system when the operator platform is intermediate the deployed position and stowed positon.

In this way, the working machine is configured and arranged so as to only allow movement of the working machine to occur when two conditions are satisfied: when the operator platform is in the stowed position; or when the operator platform is in the deployed position and an operator is standing thereon.

The working machine may be configured to enable movement of the ground engaging propulsion system when the operator platform is in the stowed position.

The working machine may comprise a locking arrangement configured to secure the operator platform in the stowed position.

This helps to prevent accidental movement of the operator platform, which may cause the working machine to cut-out when it is being used in a walk-behind mode.

The drive arrangement may comprise a hydraulic motor for providing motive power to the ground engaging propulsion system. The working machine may be configured to stop hydraulic fluid flowing to the hydraulic motor in order to prevent movement of the ground engaging propulsion system.

The drive arrangement may comprises a hydraulic pump configured to drive a hydraulic motor for providing motive power to the ground engaging propulsion system. The working machine may be configured to stop the hydraulic pump in order to prevent movement of the dumper vehicle.

The working machine may comprise a mechanical brake for inhibiting movement of the ground engaging propulsion system. The working machine may be configured to actuate the mechanical brake in order to prevent movement of working machine.

The working machine may comprise a biasing element configured and arranged to urge the operator platform away from the deployed position. The sensor arrangement may be configured to sense when an external force is applied to the operator platform when said operator platform is in the deployed position only when the biasing element has been overcome.

The biasing element may be a torsion spring.

The sensor arrangement may comprise a proximity sensor configured to sense when the biasing element has been overcome.

The sensor arrangement may comprises a limit switch arranged to engage a cam surface associated with the operator platform such that the limit switch is configured to determine when the biasing element has been overcome.

The provision of a cam arrangement for enabling/preventing movement of the ground engaging propulsion system provides controlled movement between the active and passive states.

The limit switch and cam surface may be arranged such that movement of the platform is configured and arranged to move the limit switch between a first position in which movement of the ground engaging propulsion system is enabled and a second positon in which movement of the ground engaging propulsion system is prevented.

This system provides an arrangement where the limit switch is in a first position to allow movement of the working machine when the operator platform is in the stowed position or when it is in the deployed position and the biasing element is overcome. Due to the arrangement of the cam surface, when the operator platform is positioned at any other intermediate position the limit switch is in a second positon in which movement of the working machine is prevented.

The sensor arrangement may comprise a conductive element rotationally fixed relative to the operator platform and may comprise a magnetic field sensor configured and arranged to sense the position of the conductive element.

The conductive element may comprise a first aperture positioned proximate the magnetic field sensor, when the operator platform is in the stowed position, and a second aperture positioned proximate the magnetic field sensor, when the operator platform is in the deployed position.

The first and second apertures may comprises conductive fasteners secured thereto.

The operator platform may be arranged to abut the frame when in the deployed position. The sensor arrangement may comprise a contact sensor configured to detect when the biasing element is overcome such that the operator platform abuts against the frame.

The sensor arrangement may comprise a compression sensor configured to sense a force applied by the operator platform onto the frame to sense when an external force is applied to the operator platform when said operator platform is in the deployed position.

The working machine may be configured to prevent operation of the working machine when the sensor arrangement does not sense an external force applied to the operator platform when said operator platform is in the deployed positon.

The working machine may comprise operator controls positioned at or near a rear of the dumper vehicle.

The ground engaging propulsion system may comprise a pair of endless tracks or front and rear wheels.

The prime mover may comprise an internal combustion engine or an electrical storage unit (e.g. a battery).

A further aspect of the teachings provides a dumper vehicle comprising: a frame; a ground engaging propulsion system connected to the frame for propelling the dumper vehicle; an open topped container mounted to the frame for carrying a load therein, wherein the container is moveable between a transport position for transporting a load and a discharge position for discharging a load; a drive arrangement for providing motive power to the ground engaging propulsion system; an operator platform pivotally connected to the frame and moveable between a deployed position for supporting an operator thereon and a stowed position; and a sensor arrangement configured to sense when an external force is applied to the operator platform when said operator platform is in the deployed position, wherein the dumper vehicle is configured to prevent movement of the ground engaging propulsion system when the sensor arrangement does not sense an external force applied to the operator platform when said operator platform is in the deployed positon.

The dumper vehicle has two modes of operator: a walk behind mode in which the operator platform is in the stowed position and the operator walks behind the vehicle; and a ride-on monde in which the operator is stood on the operator platform.

The sensor arrangement is able to determine whether or not an operator is standing on the platform (by determination of whether a force is applied to the platform, e.g. an upper surface of said platform). Thus, the dumper vehicle provides an arrangement where said vehicle cannot be driven with the operator platform in the deployed position unless an operator is standing on the platform.

The dumper vehicle may be configured to prevent movement of the ground engaging propulsion system when the sensor arrangement does not sense an external force above a pre-determined value applied to the operator platform when said operator platform is in the deployed positon.

This helps to improve the accuracy of the determination of whether an operator is on the platform and prevents operation of the machine occurring when small items or debris fall on the operator platform.

The dumper vehicle may be configured to prevent movement of the ground engaging propulsion system when the operator platform is intermediate the deployed position and stowed positon.

In this way, the dumper vehicle is configured and arranged so as to only allow movement of the dumper vehicle to occur when two conditions are satisfied: when the operator platform is in the stowed position; or when the operator platform is in the deployed position and an operator is standing thereon.

The dumper vehicle may be configured to enable movement of the ground engaging propulsion system when the operator platform is in the stowed position.

The dumper vehicle may comprise a locking arrangement configured to secure the operator platform in the stowed position.

This helps to prevent accidental movement of the operator platform, which may cause the dumper vehicle to cut-out when it is being used in a walk-behind mode.

The drive arrangement may comprise a hydraulic motor for providing motive power to the ground engaging propulsion system. The dumper vehicle may be configured to stop hydraulic fluid flowing to the hydraulic motor in order to prevent movement of the ground engaging propulsion system.

The drive arrangement may comprises a hydraulic pump configured to drive a hydraulic motor for providing motive power to the ground engaging propulsion system. The dumper vehicle may be configured to stop the hydraulic pump in order to prevent movement of the dumper vehicle.

The dumper vehicle may comprise a mechanical brake for inhibiting movement of the ground engaging propulsion system. The dumper vehicle may be configured to actuate the mechanical brake in order to prevent movement of the dumper vehicle.

The dumper vehicle may comprise a biasing element configured and arranged to urge the operator platform away from the deployed position. The sensor arrangement may be configured to sense when an external force is applied to the operator platform when said operator platform is in the deployed position only when the biasing element has been overcome.

The biasing element may be a torsion spring.

The sensor arrangement may comprise a proximity sensor configured to sense when the biasing element has been overcome.

The sensor arrangement may comprises a limit switch arranged to engage a cam surface associated with the operator platform such that the limit switch is configured to determine when the biasing element has been overcome.

The provision of a cam arrangement for enabling/preventing movement of the ground engaging propulsion system provides controlled movement between the active and passive states.

The limit switch and cam surface may be arranged such that movement of the platform is configured and arranged to move the limit switch between a first position in which movement of the ground engaging propulsion system is enabled and a second positon in which movement of the ground engaging propulsion system is prevented.

This system provides an arrangement where the limit switch is in a first position to allow movement of the dumper vehicle when the operator platform is in the stowed position or when it is in the deployed position and the biasing element is overcome. Due to the arrangement of the cam surface, when the operator platform is positioned at any other intermediate position the limit switch is in a second positon in which movement of the dumper vehicle is prevented.

The sensor arrangement may comprise a conductive element rotationally fixed relative to the operator platform and may comprise a magnetic field sensor configured and arranged to sense the position of the conductive element.

The conductive element may comprise a first aperture positioned proximate the magnetic field sensor, when the operator platform is in the stowed position, and a second aperture positioned proximate the magnetic field sensor, when the operator platform is in the deployed position.

The first and second apertures may comprises conductive fasteners secured thereto.

The operator platform may be arranged to abut the frame when in the deployed position. The sensor arrangement may comprise a contact sensor configured to detect when the biasing element is overcome such that the operator platform abuts against the frame.

The sensor arrangement may comprise a compression sensor configured to sense a force applied by the operator platform onto the frame to sense when an external force is applied to the operator platform when said operator platform is in the deployed position.

The dumper vehicle may be configured to prevent operation of the dumper vehicle when the sensor arrangement does not sense an external force applied to the operator platform when said operator platform is in the deployed positon.

The dumper vehicle may comprise operator controls positioned at or near a rear of the dumper vehicle.

The ground engaging propulsion system may comprise a pair of endless tracks or front and rear wheels.

The container may define an upper extent thereof, and wherein said upper extent of the container may decrease in height with respect to the frame towards the front end of the frame, when the container is in the transport position.

The prime mover may comprise an internal combustion engine or an electrical storage unit (e.g. a battery).

BRIEF DESCRIPTION OF THE DRAWINGS

Embodiments will now be described with reference to the accompanying drawings, in which.

DETAILED DESCRIPTION OF EMBODIMENT(S)

Figure 1:
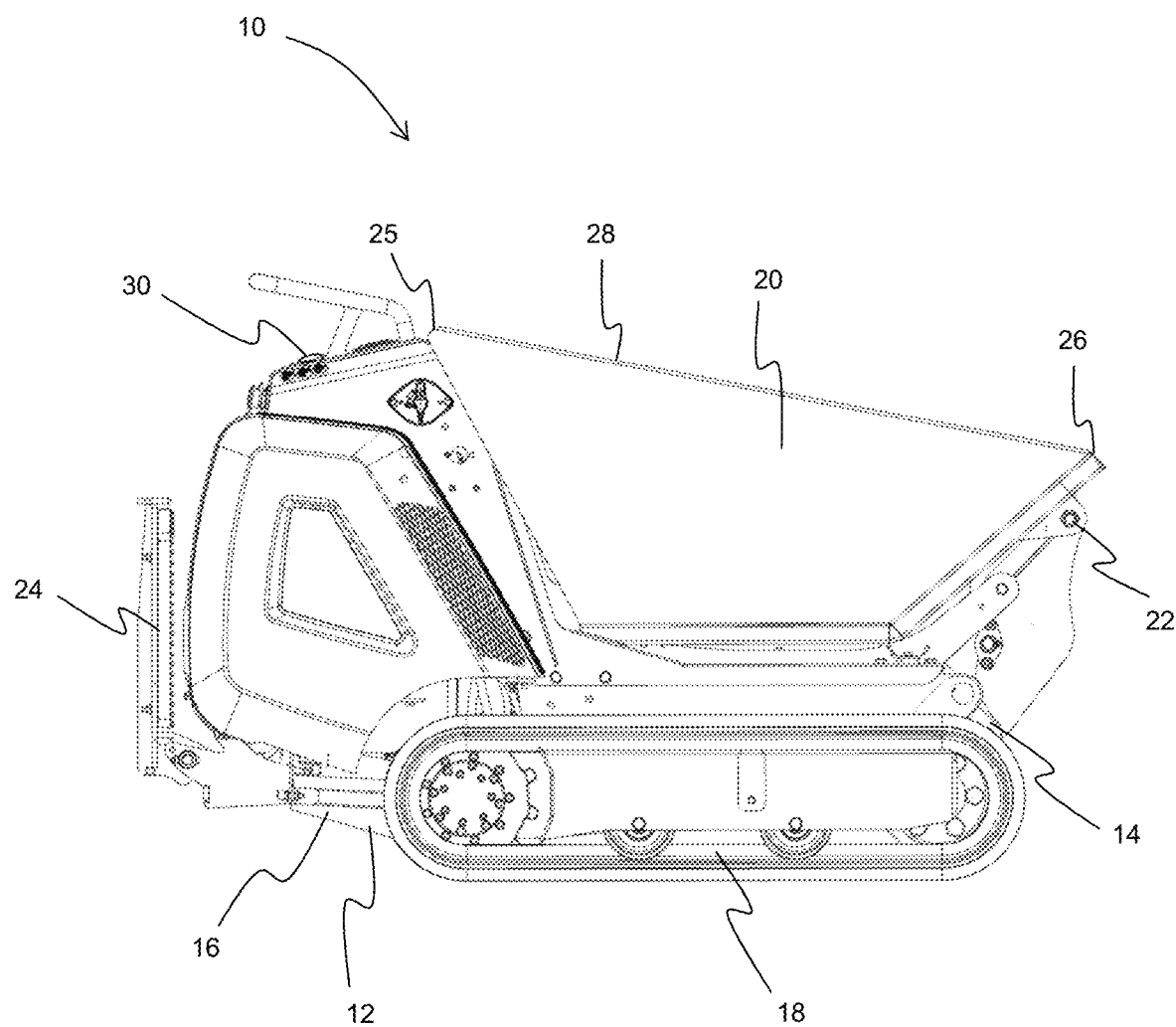
FIG. 1 is a side view of a dumper vehicle with an operator platform in a stowed position.
Figure 2:
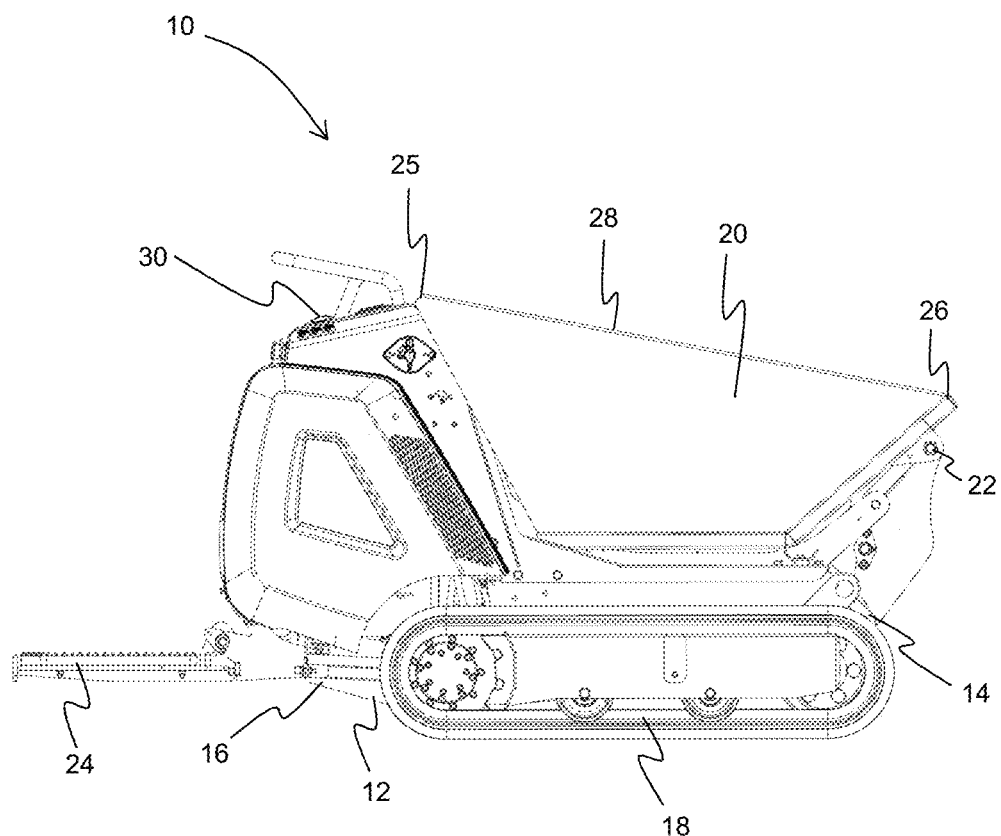
FIG. 2 is a side view of the dumper vehicle of FIG. 1 with the operator platform in the deployed position.
Figure 3:
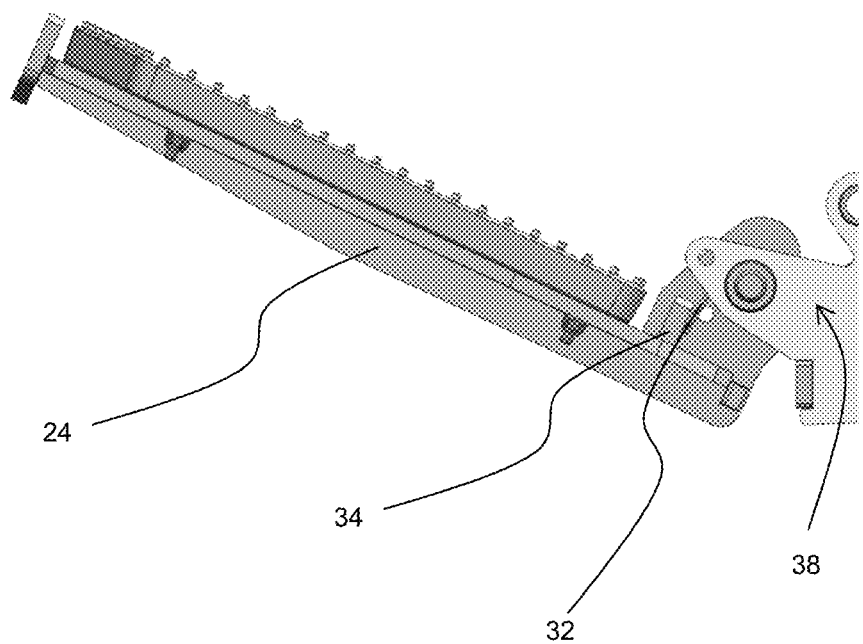
FIG. 3 is a side view of the operator platform of the dumper vehicle of FIG. 1.

Referring firstly to FIGS. 1 to 3, there is illustrated a working machine 10 according to an embodiment. In the illustrated arrangement, the working machine is a dumper vehicle 10.

The working machine 10 includes a structural chassis frame 12 having a front end 14 and a rear end 16. A ground engaging propulsion system 18 is provided on the working machine 10 for propelling the working machine 10. In the arrangement shown, the ground engaging propulsion system includes two endless tracks 18 mounted to the frame 12. In alternative arrangements, the ground engaging propulsion system may be provided in the form of front and rear wheels mounted to the frame 12.

The working machine 10 is provided with an open topped container 20 for carrying a load therein, commonly referred to as a skip, mounted to the frame 12. The working machine 10 has a nominal carrying capacity of approximately 500 kg, but it will be appreciated that the working machine 10, i.e. the open topped container 20, may be varied in size to suit the application.

The container 20 is pivotally mounted to the frame 12 via pivotable mounts 22 which enables the container 20 to be moveable or pivotable proximate the front end 14 of the frame 12. The container 20 is moveable or pivotable relative to the frame 12 between a transport position for transporting a load (as shown in FIG. 1) and a discharge position for discharging of a load.

The container 20 defines an upper edge thereof. The upper edge of the container 20 includes a rear edge 25, a front edge 26 and two side edges 28 extending between the rear and front edges 25, 26. When mounted on the frame 12 and in the transport position, the upper extent container 20 decreases in height towards the front end 14 of the frame 12. That is, the side edges 28 of the upper extent of the container 20 decrease in height towards the front end 14 of the frame 12. The upper extent of the container 20 (i.e. the side edges 28 thereof) continuously decreases in height. This decreasing height works to increase the visibility over the container 20 for an operator. Although not illustrated, the open topped container 20 may be mounted to the frame 12 via a pair of lifting arms to move the open topped container 20 in a direction away from the frame 12 (i.e. to raise the open topped container 20).

The working machine 10 is provided with a drive arrangement for providing motive power to the ground engaging propulsion system 18. In the arrangement shown, the working machine 10 is an electric vehicle and the drive arrangement includes a prime mover in the form of an electrical energy storage unit (not shown) for providing electrical power to the working machine 10. In this embodiment the electrical energy storage unit comprises batteries, but in other embodiments may utilise capacitors or a combination of batteries and capacitors; or other storage technologies. In other embodiments the working machine 10 may be a "hybrid" working machine in which the prime mover is provided as both an internal combustion engine (ICE) and electric motors in order to supply power to the ground engaging propulsion system and/or the actuators to move the container 20 between the transport and discharge positions.

The working machine 10 has a drive arrangement that includes a hydraulic motor (not shown) coupled to the prime mover (e.g. the electrical energy storage unit or the ICE) via suitable control electrics (not shown). The hydraulic motor is configured to drive movement of the ground engaging propulsion system 18. The hydraulic motor is configured to drive a hydraulic pump (not shown) that in turn provides motive power to the ground engaging propulsion system 18 via one or more hydraulic propulsion motors (not shown).

The working machine 10 includes an operator platform 24 pivotally connected to the frame 12. In the arrangement shown, the operator platform 24 is pivotally connected to a rear end 16 of the frame 12. The operator platform 24 is moveable between a stowed position (see FIG. 1) and a deployed position for supporting an operator thereon (see FIG. 2). Although not illustrated, the working machine 10 may include a locking arrangement configured to secure the operator platform 24 in the stowed position.

The working machine 10 includes operator controls 30 positioned at or near a rear of the working machine 10. The moveable operator platform 24 enables the working machine 10 to have two modes of operator: a walk behind mode in which the operator platform 24 is in the stowed position and an operator walks behind the working machine 10; and a ride-on mode in which an operator is stood on the operator platform 24.

The working machine 10 has a sensor arrangement configured to determine when an external force is applied to the operator platform 24, when said operator platform is in the deployed position. This arrangement enables the working machine 10 to determine when an operator is standing on the operator platform 24, when the operator platform 24 is in the deployed position.

The working machine 10 is configured to prevent movement of the ground engaging propulsion system 18 when the sensor arrangement does not sense an external force (e.g. an external force above a predetermined value) applied to the operator platform 24 when said operator platform 24 is in the deployed positon. Put another way, the working machine 10 is configured to prevent movement of the ground engaging propulsion system 18 when the operator platform 24 is in the deployed positon and an operator is not stood on said platform 24.

The working machine 10 is configured to enable movement of the ground engaging propulsion system 18 when the operator platform 24 is in the stowed position. The working machine 10 is configured to prevent movement of the ground engaging propulsion system 18 when the operator platform 24 is intermediate the deployed position and stowed positon.

The sensor arrangement is able to determine whether or not an operator is standing on the platform 24 (by determination of whether a force is applied to the platform, e.g. an upper surface of said platform). Thus, the working machine 10 provides an arrangement where said vehicle cannot be driven with the operator platform 24 in the deployed position unless an operator is standing on the platform. In this way, the working machine 10 is configured and arranged so as to only allow movement of the working machine 10 to occur when two conditions are satisfied: when the operator platform 24 is in the stowed position; or when the operator platform 24 is in the deployed position and an operator is standing thereon.

It will be appreciated that the working machine 10 may utilise different methods in order to prevent movement of the ground engaging propulsion system 18. The working machine 10 may be configured so as to: stop hydraulic fluid flowing to the hydraulic propulsion motor(s) in order to prevent movement of the ground engaging propulsion system; prevent operation of (i.e. stop) the hydraulic pump in order to prevent movement of the working machine; and/or apply a mechanical brake (not shown) to inhibit movement of the ground engaging propulsion system 18.

Referring to FIG. 3, the operator platform 24 is illustrated in more detail.

As is illustrated, when the operator platform 24 is in the deployed position with no operator stood thereon, the working machine 10 is configured to bias the operator platform away from the deployed position. The working machine 10 includes a biasing element 32 configured and arranged to urge the operator platform 24 away from the deployed position. The biasing element 32 is a torsion spring that is arranged to abut against a projection 34 of the operator platform 24. The provision of the biasing element 32 deflects the operator platform 24 away from the deployed position such that the platform is arranged at a small angle relative to the deployed positon, e.g. around 5 to 10°. It will be appreciated that in alternative arrangements the biasing element 32 may be configured such that the operator platform 24 may be positioned at any suitable angle away from the fully deployed position.

The sensor arrangement is configured to sense when an external force is applied to the operator platform 24 when said operator platform is in the deployed position only when the biasing element 32 has been overcome. It will be appreciated that the biasing element will be selected such that the weight of an operator standing on the platform is sufficient to overcome the biasing element.

Figure 4:
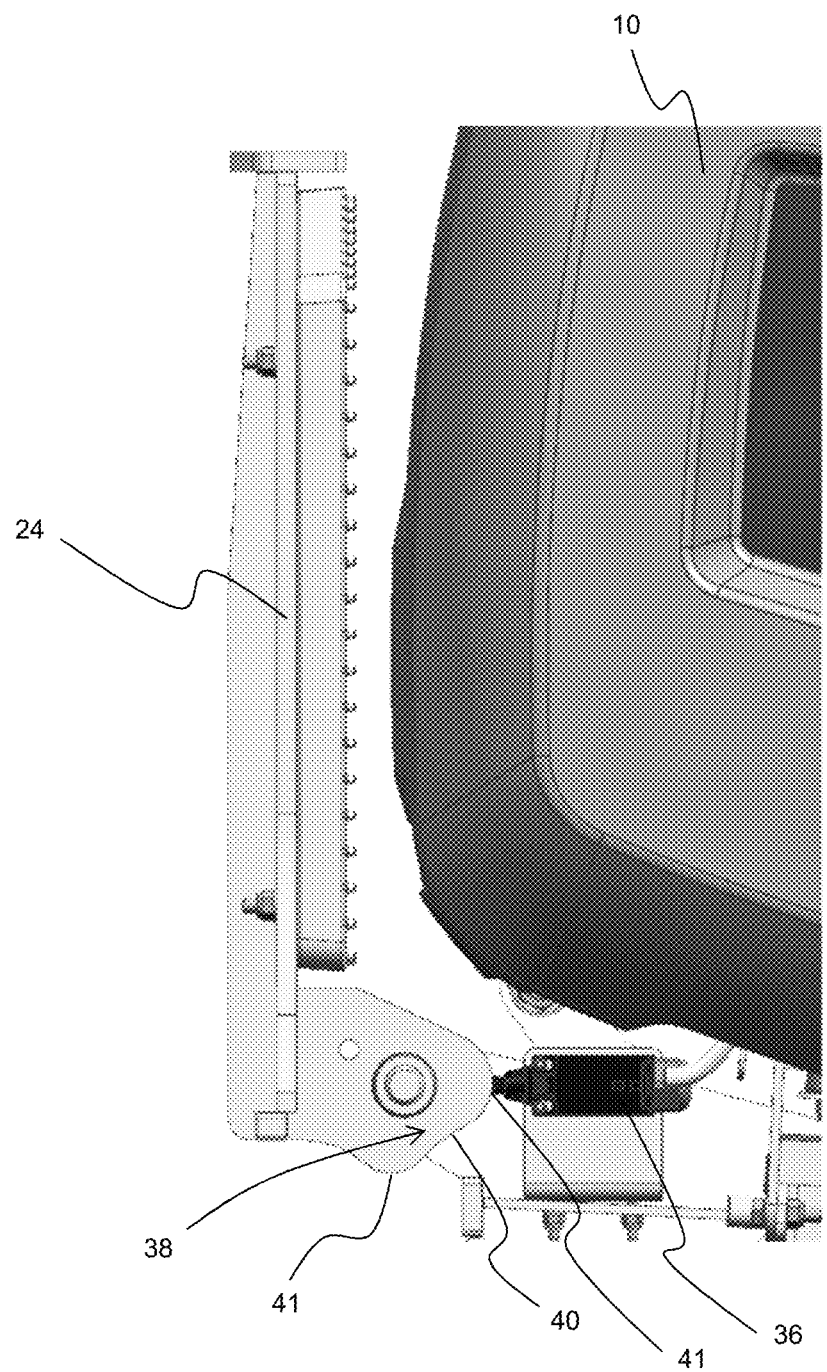
FIGS. 4 to 6 are side views of the operator platform of the dumper vehicle of FIG. 1.
Figure 5:
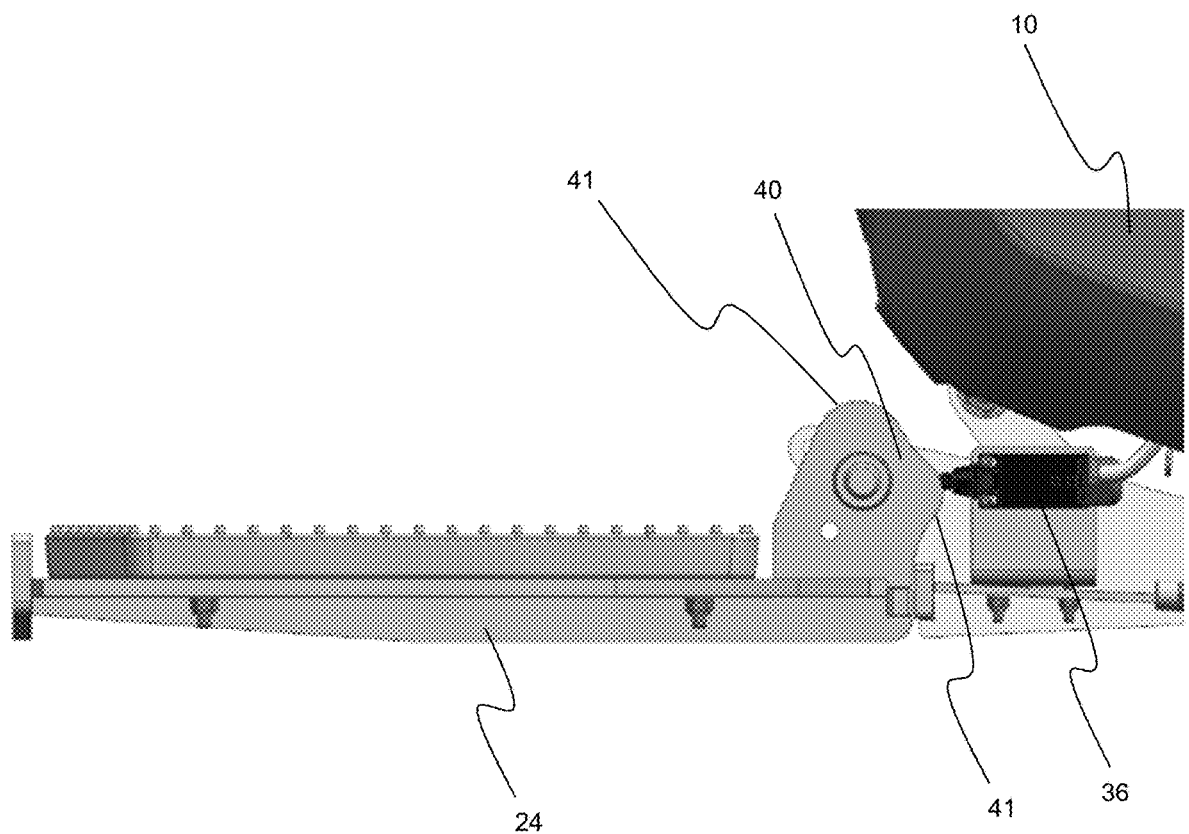
Figure 6:
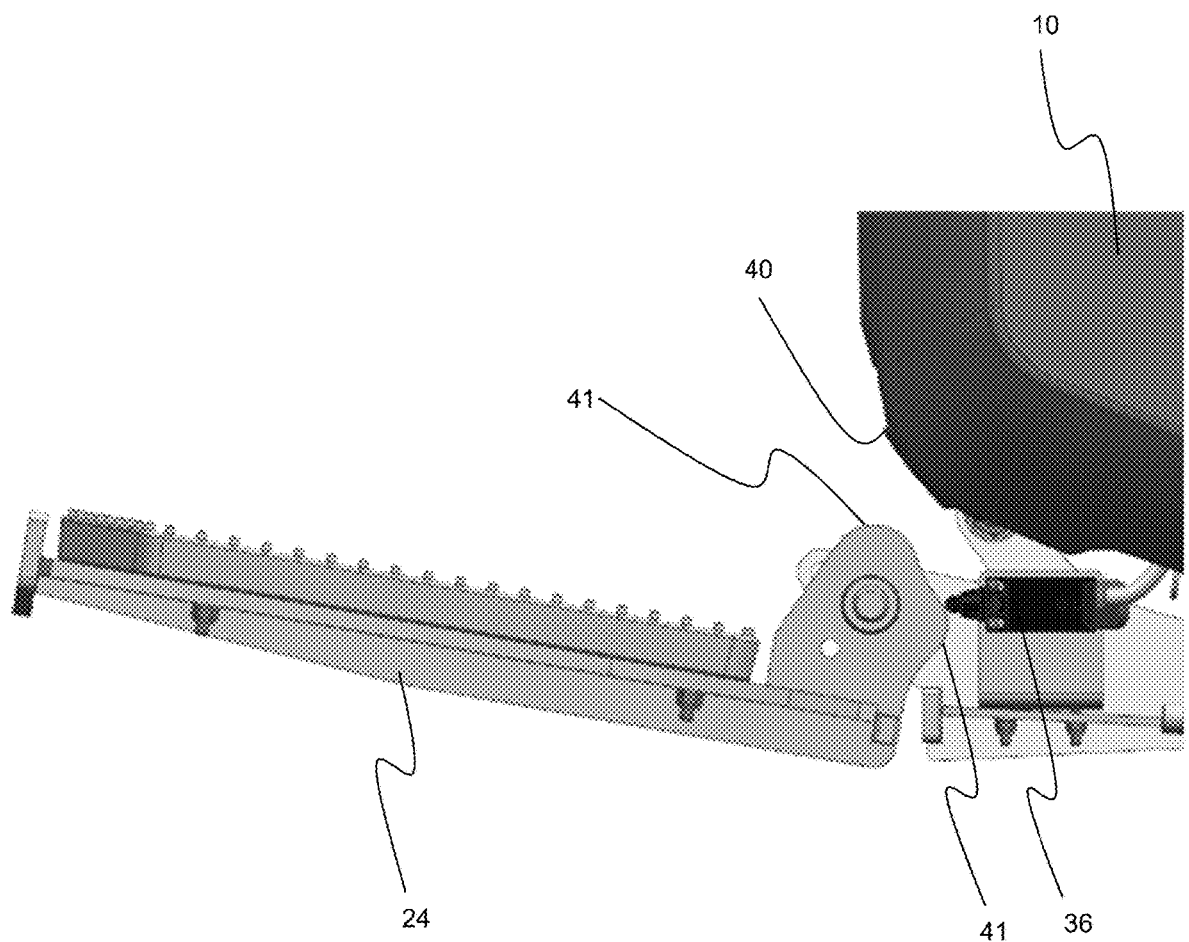

Referring now to FIGS. 4 to 6, an embodiment of the sensor arrangement is illustrated.

The sensor arrangement comprises a sensor 36 configured to sense when the biasing element 32 has been overcome in order to determine when an operator is standing on the operator platform 24. In the illustrated arrangement, the sensor includes a limit switch 36.

The limit switch 36 is arranged to engage a cam surface 38 associated with the operator platform 24, where said cam surface 34 is moveable through movement of the operator platform 24.

The limit switch 36 is configured and arranged so as to be capable of determining when the biasing element 32 has been overcome. During movement of the operator platform 24 between the stowed and the deployed positions, the cam surface 38 is arranged such that as the limit switch 36 moves over the cam surface 38 the limit switch moves between retracted and extended positions. The provision of a cam arrangement for enabling/preventing movement of the ground engaging propulsion system provides controlled movement between the active and passive states for enabling/preventing movement of the ground engaging propulsion system 18.

The limit switch 36 and cam surface 38 are arranged such that movement of the platform is configured and arranged to move the limit switch 36 between a first position in which movement of the ground engaging propulsion system 18 is enabled and a second positon in which movement of the ground engaging propulsion system 18 is prevented.

This system provides an arrangement where the limit switch is in a first, or retracted, position to allow movement of the working machine 10 when the operator platform 24 is in the stowed position or when it is in the deployed position and the biasing element 32 is overcome.

The cam surface 38 includes a recessed section 40 arranged such that when the operator platform 24 is positioned at any other intermediate position (i.e. between stowed position and fully deployed position) the limit switch 36 is in a second, or extended, positon in which movement of the working machine 10 is prevented.

Put another way, when the operator platform 24 is in the deployed position but no operator is stood thereon (as shown in FIG. 6), the limit switch 36 abuts against the recessed section 40 of the cam surface 38 and is in an extended state. In this state, movement of the ground engaging propulsion system 18 is prevented. When the operator platform 24 is in the stowed position (as shown in FIG. 4) or when the operator platform 24 has an operator stood thereon in the deployed position (see FIG. 5), the limit switch 36 abuts against one of the protruding sections 41 of the cam surface 38 and so is in a retracted state. In this state, movement of the ground engaging propulsion system 18 is possible.

Figure 7:
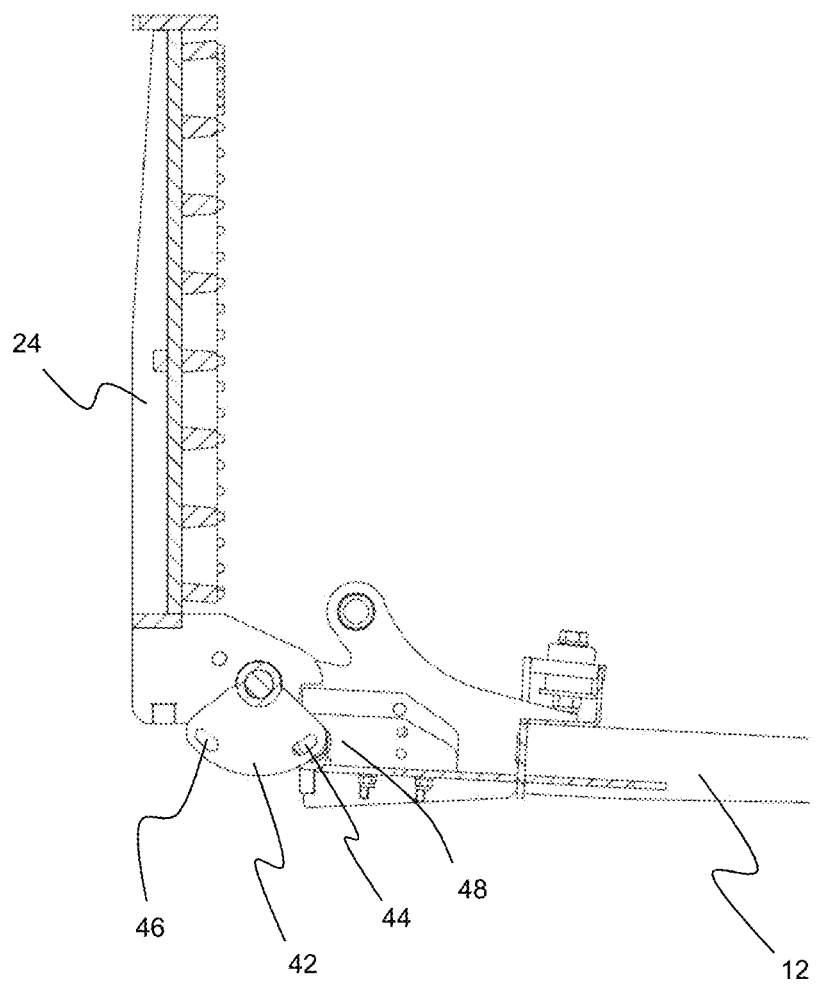
FIGS. 7 to 9 are side views of an operator platform of a working machine.
Figure 8:
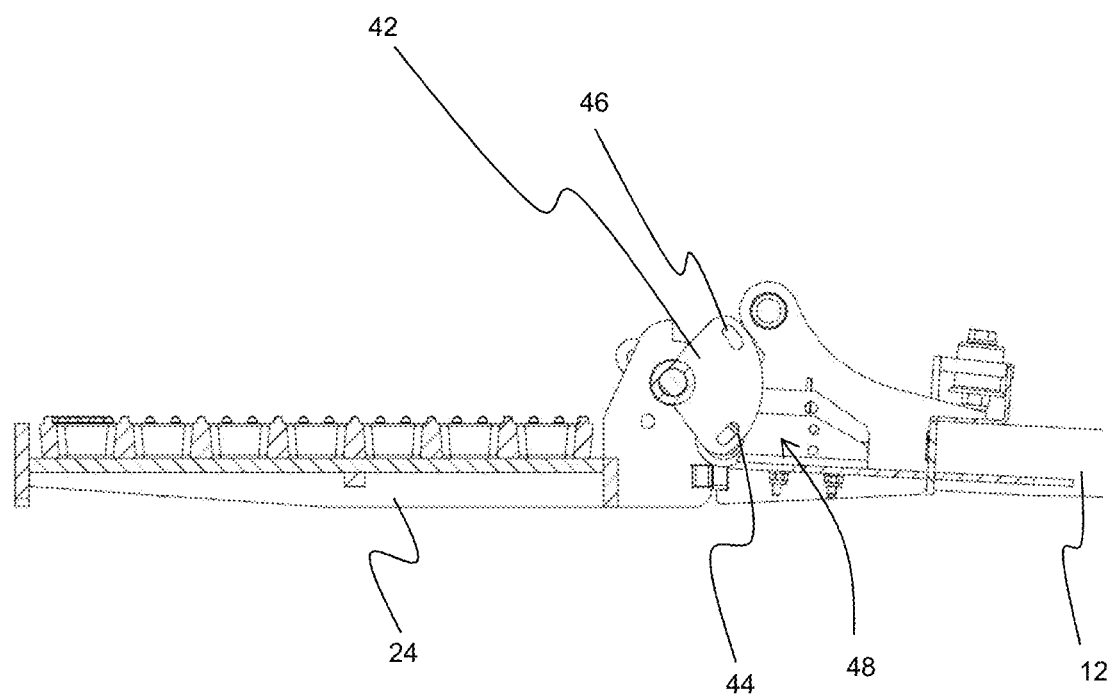
Figure 9:
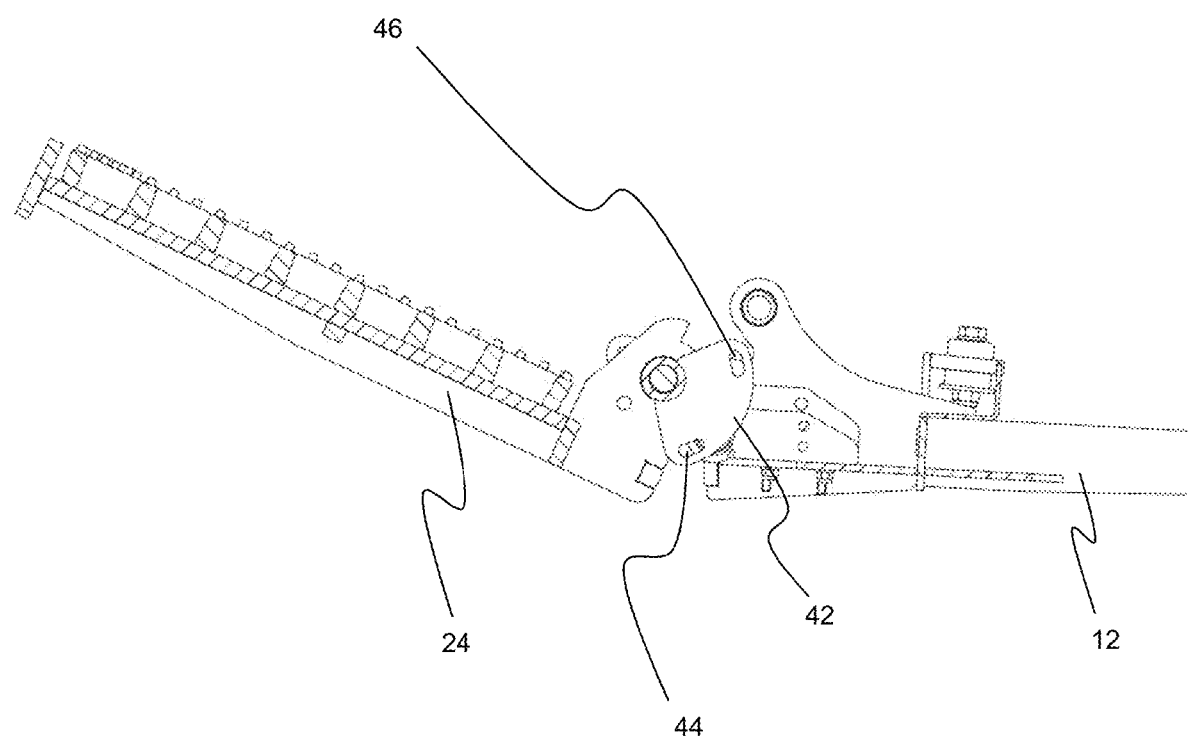

Referring now to FIGS. 6 to 8, an embodiment of the sensor arrangement is illustrated.

The sensor arrangement comprises a sensor 48 configured to sense when the biasing element 32 has been overcome in order to determine when an operator is standing on the operator platform 24. In the illustrated arrangement, the sensor includes a proximity sensor 48.

The sensor arrangement includes a conductive element 42 rotationally fixed relative to the operator platform 24. The conductive element 42 is provided as a disc attached, e.g. welded, to the operator platform 24. The conductive element 42 includes a first aperture 44 and a second aperture 46. The proximity sensor 48 is configured and arranged to sense the position of the first and second apertures 44, 46 of the conductive element 42.

In the illustrated arrangement, the proximity sensor includes a magnetic field sensor 48 configured and arranged to sense the position of the first and second apertures 44, 46 of the conductive element 42. Although not illustrated for clarity, the first and second aperture 44, 46 will have metallic fasteners secured therein, and the proximity sensor 48 is arranged to sense the position of the first and second apertures 44, 46 by sensing the proximity of the respective metallic fasteners.

The apertures 44, 46 of the conductive element 42 are arranged such that the first aperture 44 is positioned proximate the magnetic field sensor, when the operator platform is in the stowed position. The apertures 44, 46 of the conductive element 42 are arranged such that the second aperture 46 is positioned proximate the magnetic field sensor 48, when the operator platform 24 is in the deployed position.

The sensor arrangements illustrated in FIGS. 3 to 8 may be utilised independently or in combination. In addition, it will be appreciated that in alternative arrangements, different sensor arrangements may employed either in place of or in combination with the sensor arrangements illustrated in FIGS. 3 to 8.

The sensor arrangement may include a contact sensor that is configured to detect when the biasing element is overcome such that the operator platform 24 abuts against the frame 12.

The sensor arrangement may include a compression sensor configured to sense a force applied by the operator platform 24 onto the frame 12 to sense when an external force is applied to the operator platform 24 when said operator platform 24 is in the deployed position.

Whilst the operator platform 20 and the associated sensor arrangement has been described with reference to the working machine being a dumper vehicle, it will be appreciated that in alternative arrangements the operator platform and associated sensor arrangement may be utilised in other working machines such as a loader, a wheeled loading shovel (i.e. a ride-on wheeled or tracked loading shovel), a lawnmower or any other suitable ride-on working machine.

Although the teachings have been described above with reference to one or more preferred embodiments, it will be appreciated that various changes or modifications may be made without departing from the scope as defined in the appended claims.

The invention claimed is:

1. A working machine comprising:
a frame;
a ground engaging propulsion system connected to the frame for propelling the working machine;
a drive arrangement for providing motive power to the ground engaging propulsion system;
an operator platform pivotally connected to the frame and moveable between a deployed position for supporting an operator thereon and a stowed position; and
a sensor arrangement configured to sense when an external force is applied to the operator platform when said operator platform is in the deployed position,
wherein the working machine is configured to prevent movement of the ground engaging propulsion system when the sensor arrangement does not sense an external force applied to the operator platform when said operator platform is in the deployed position; and
wherein the sensor arrangement comprises a biasing element configured to urge the operator platform away from the deployed position and a limit switch arranged to engage a cam surface associated with the operator platform such that the limit switch is configured to determine when an external force is applied to the operator platform and the biasing element has been overcome;
wherein the limit switch and the cam surface are arranged such that the limit switch is in a first position when the operator platform is in the stowed position and when the operator platform is in the deployed position and the biasing element has been overcome, and wherein when the limit switch is in the first position, movement of the ground engaging structure is enabled; and
wherein the limit switch and the cam surface are arranged such that the limit switch is in a second position when the operator platform is intermediate the stowed position and the deployed position, and wherein when the limit switch is in the second position, movement of the ground engaging structure is prevented.

2. The working machine according to claim 1, wherein the working machine is configured to prevent movement of the ground engaging propulsion system when the sensor arrangement does not sense an external force above a pre-determined value applied to the operator platform when said operator platform is in the deployed position.

3. The working machine according to claim 1, wherein the working machine is configured to prevent movement of the ground engaging propulsion system when the operator platform is intermediate the deployed position and stowed position.

4. The working machine according to claim 1, wherein the working machine is configured to enable movement of the ground engaging propulsion system when the operator platform is in the stowed position.

5. The working machine according to claim 1, wherein the working machine comprises a locking arrangement configured to secure the operator platform in the stowed position.

6. The working machine according to claim 1, wherein the drive arrangement comprises a hydraulic motor for providing motive power to the ground engaging propulsion system, and wherein the working machine is configured to stop hydraulic fluid flowing to the hydraulic motor in order to prevent movement of the ground engaging propulsion system.

7. The working machine according to claim 1, wherein the drive arrangement comprises a hydraulic pump configured to drive a hydraulic motor for providing motive power to the ground engaging propulsion system, and wherein the working machine is configured to stop the hydraulic pump in order to prevent movement of the working machine.

8. The working machine according to claim 1, further comprising a mechanical brake for inhibiting movement of the ground engaging propulsion system, and wherein the working machine is configured to actuate the mechanical brake in order to prevent movement of the working machine.

9. The working machine according to claim 1, wherein the biasing element is a torsion spring.

10. The working machine according to claim 9, wherein the sensor arrangement comprises a proximity sensor configured to sense when the biasing element has been overcome.

11. The working machine according to claim 9, wherein the operator platform is arranged to abut the frame when in the deployed position, and wherein the sensor arrangement comprises a contact sensor configured to detect when the biasing element is overcome such that the operator platform abuts against the frame.

12. The working machine according to claim 1, wherein the sensor arrangement comprises a conductive element rotationally fixed relative to the operator platform and a magnetic field sensor configured and arranged to sense the position of the conductive element, wherein the conductive element comprises a first aperture positioned proximate the magnetic field sensor, when the operator platform is in the stowed position, and a second aperture positioned proximate the magnetic field sensor, when the operator platform is in the deployed position.

13. The machine according to claim 1, wherein the sensor arrangement comprises a compression sensor configured to sense a force applied by the operator platform onto the frame to sense when an external force is applied to the operator platform when said operator platform is in the deployed position.

14. The working machine according to claim 1, wherein the working machine is configured to prevent operation of the working machine when the sensor arrangement does not sense an external force applied to the operator platform when said operator platform is in the deployed position.

15. The working machine according to claim 1, wherein the working machine comprises operator controls positioned at or near a rear of the working machine.

16. The working machine according to claim 1, wherein the ground engaging propulsion system comprises a pair of endless tracks or front and rear wheels.

17. The working machine according to claim 1, wherein the cam surface includes a recessed section, the recessed section arranged such that when the operator platform is at an intermediate position between the stowed position and the deployed position the limit switch is in a second position in which movement of the working machine is prevented.

18. A working machine in the form of a dumper vehicle, comprising:
  a frame;
  a ground engaging propulsion system connected to the frame for propelling the dumper vehicle;
  a drive arrangement for providing motive power to the ground engaging propulsion system;
  an operator platform pivotally connected to the frame and moveable between a deployed position for supporting an operator thereon and a stowed position; and
  a sensor arrangement configured to sense when an external force is applied to the operator platform when said operator platform is in the deployed position,
  wherein the dumper vehicle is configured to prevent movement of the ground engaging propulsion system when the sensor arrangement does not sense an external force applied to the operator platform when said operator platform is in the deployed position,
  wherein the dumper vehicle comprises an open topped container mounted to the frame for carrying a load therein, wherein the container is moveable between a transport position for transporting a load and a discharge position for discharging a load; and
  wherein the sensor arrangement comprises a biasing element configured to urge the operator platform away from the deployed position, and a limit switch arranged to engage a cam surface associated with the operator platform, such that the limit switch is configured to determine when an external force is applied to the operator platform and the biasing element has been overcome;
  wherein the limit switch and the cam surface are arranged such that the limit switch is in a first position when the operator platform is in the stowed position and when the operator platform is in the deployed position and the biasing element has been overcome, and wherein when the limit switch is in the first position, movement of the ground engaging structure is enabled; and
  wherein the limit switch and the cam surface are arranged such that the limit switch is in a second position when the operator platform is intermediate the stowed position and the deployed position, and wherein when the limit switch is in the second position, movement of the ground engaging structure is prevented.

19. A working machine in the form of a loader, comprising:
  a frame;
  a loading shovel mounted to the frame;
  a ground engaging propulsion system connected to the frame for propelling the loader;
  a drive arrangement for providing motive power to the ground engaging propulsion system;
  an operator platform pivotally connected to the frame and moveable between a deployed position for supporting an operator thereon and a stowed position; and
  a sensor arrangement configured to sense when an external force is applied to the operator platform when said operator platform is in the deployed position;
  wherein the loader is configured to prevent movement of the ground engaging propulsion system when the sensor arrangement does not sense an external force applied to the operator platform when said operator platform is in the deployed position;
  wherein the sensor arrangement including a biasing element configured to urge the operator platform away from the deployed position, and a limit switch arranged to engage a cam surface associated with the operator platform, such that the limit switch is configured to determine when an external force is applied to the operator platform and the biasing element has been overcome;
  wherein the limit switch and the cam surface are arranged such that the limit switch is in a first position when the operator platform is in the stowed position and when the operator platform is in the deployed position and the biasing element has been overcome, and wherein when the limit switch is in the first position, movement of the ground engaging structure is enabled; and
  wherein the limit switch and the cam surface are arranged such that the limit switch is in a second position when the operator platform is intermediate the stowed position and the deployed position, and wherein when the limit switch is in the second position, movement of the ground engaging structure is prevented.

* * * * *